United States Patent [19]

Reichard et al.

[11] Patent Number: 5,999,618
[45] Date of Patent: Dec. 7, 1999

[54] TELEPHONE INTERFACE FOR SIMULTANEOUS AUDIO PRESENTATION AT SEPARATE LOCATIONS UTILIZING AMPLITUDE MODULATED CARRIER SIGNALS

[76] Inventors: Jeffrey A. Reichard, 2533 S. 117th St., West Allis, Wis. 53227; Gregory R. Brotz, 218 Pioneer Rd., Sheboygan, Wis. 53081

[21] Appl. No.: 08/920,853

[22] Filed: Aug. 29, 1997

[51] Int. Cl.⁶ .................................................. H04M 11/00
[52] U.S. Cl. ........................................... 379/387; 370/295
[58] Field of Search .................................. 379/90.01, 389, 379/390, 85, 81, 387, 202, 204, 205, 206, 207, 90; 84/624, 625, 647, 648, 675; 370/260, 276, 282; 455/416; 340/310.06

[56] References Cited

U.S. PATENT DOCUMENTS

| 4,644,526 | 2/1987 | Wu | 370/30 |
| 5,020,101 | 5/1991 | Brotz et al. | 379/389 |
| 5,398,278 | 3/1995 | Brotz | 379/90 |

OTHER PUBLICATIONS

Jerry Gibson, Principles of Digital and Analog Communication, MacMillan Publishing, ISBN 0-02-341780-3, 1989, pp. 125-127.

Primary Examiner—Forester W. Isen
Assistant Examiner—Brian T. Pendleton
Attorney, Agent, or Firm—William Nitkin

[57] ABSTRACT

A telephone interface system for the transmission and reproduction of an audio performance, particularly a musical performance, at separate locations utilizing an amplitude modulated carrier frequency is disclosed. The system serves to both transmit a performance at one instant location to one or more remote locations and to receive and reproduce a similar performance from the remote location(s) transmitted to the instant location. The performer(s) at a first location each hear the audio output of the performance(s) at the other location(s) as though such other performer(s) were actually present at the first location and vice versa.

1 Claim, 2 Drawing Sheets

TELEPHONE INTERFACE FOR SIMULTANEOUS AUDIO PRESENTATION AT SEPARATE LOCATIONS UTILIZING AMPLITUDE MODULATED CARRIER SIGNALS

BACKGROUND OF THE INVENTION

1. Field of the Invention

The invention resides in the field of telephone circuitry and more particularly relates to the simultaneous presentation of sound, particularly music, generated by separate performers at separate locations utilizing amplitude modulated carrier frequencies.

2. Description of the Prior Art

Systems which provide means for separate performers, particularly musicians, to interact from different locations by way of the telephone have been the subject of two separate patents by the present inventor. In U.S. Pat. No. 5,020,101 to Brotz et al., and U.S. Pat. No. 5,398,278 to Brotz, there are disclosed musicians telephone interface units which enable separate performers to play at separate locations and for each to hear the other's performance simultaneously at his own location. In each patent, a system is disclosed to exclude the transmitted signal from the received signal so that the received signal at each location can be amplified to simulate the presence of the performer at the remote location as being at the instant location. In the first patent listed above, a comparator is used and in the second, frequency division multiplexing is used to exclude the transmitted signal from audio reproduction at the originating location.

SUMMARY OF THE INVENTION

The present invention is an improvement over the systems described in the above-mentioned prior art, adding enhanced fidelity and overcoming problems which may occur in the devices of the prior art in certain telephone networks.

The invention consists of an improved telephone interface unit at an instant location which provides for both the transmission to and reception from a similar unit at a remote location over bi-directional communication lines using amplitude-modulated carrier frequencies. A unit at an instant location modulates an audio input signal, for example that is generated by a musical instrument or the human voice, for transmission to a remote location; and the unit receives and demodulates a similar signal from that same remote location for amplification and presentation through a speaker system. The instant location unit transmits at a carrier frequency above some specified level, while the remote location unit transmits at a frequency below a lower specified level. Filters are further provided on both units to separate and eliminate the transmitted signal from the received signal, thereby creating the effect of the presence of the performer (s) at the remote location at the instant location through the aforementioned speakers without the interference of amplified signals from the performer(s) at the instant location.

A mixer can be used to combine the audio signals of a plurality of performers at each location to produce a composite electrical analog signal to be transmitted in the other direction. In this manner performers at diverse locations can cooperate to rehearse and perform musical and theatrical works as though all were assembled at a single location.

DESCRIPTION OF THE PREFERRED EMBODIMENT(S)

Figure 1:
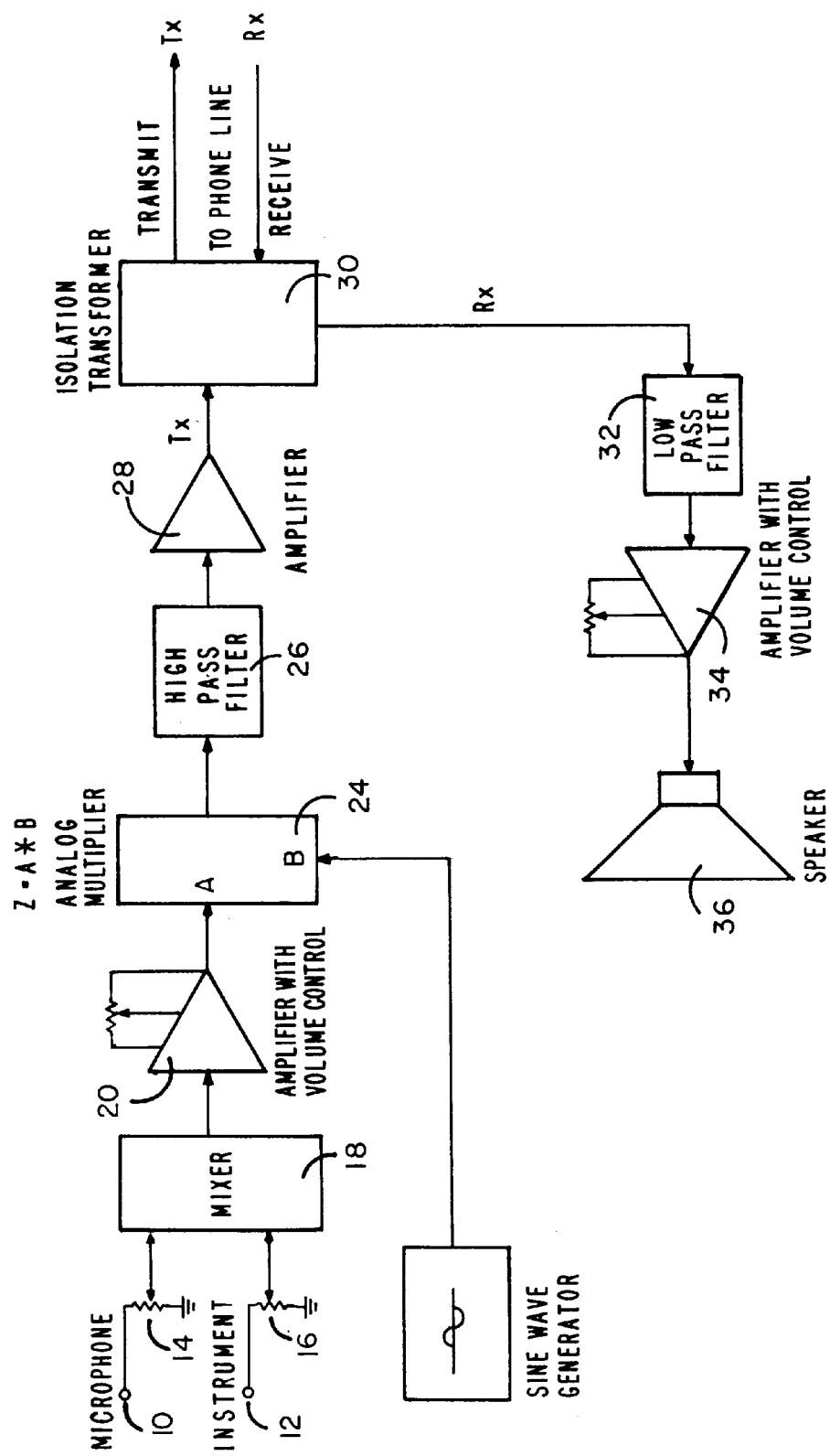
FIG. 1 illustrates a schematic diagram of the telephone interface unit of this invention at an instant location.

FIG. 1 illustrates a block diagram of the preferred embodiment of the telephone interface unit at an instant location. A microphone input 10 and instrument input 12 provide in combination with first and second volume controls 14 and 16, respectively, electrical analog signals of the audio signals produced by performers not shown. The audio signals from each performer are combined by mixer 18 and amplified by amplifier 20, which amplifier has volume control to adjust the volume of the combined audio signal. It will be understood that any number of inputs to mixer 18 may be supplied, the two shown being illustrative of the two types of signals which can be transmitted by the invention, i.e., either audio signals received by a microphone or audio signals converted to electrical signals by the instruments themselves.

The combined audio signal is sent from amplifier 20 to analog multiplier 24. Analog multiplier 24 also receives a reference or carrier signal as produced by sine wave generator 22. In the instant location unit of FIG. 1, the carrier signal produced by sine wave generator 22 should be at some selected frequency, for example at 1.5 kHz or greater. Sine wave generator 22 may constitute for example a MC68HC705K1 microprocessor available from Motorola, in combination with a digital-to-analog converter or equivalent unit generating a 2.5 kHz signal. Analog multiplier 24 multiplies the combined audio signal from amplifier 20 by the carrier signal from sine wave generator 22 to produce an amplitude modulated signal. High pass filter 26 filters out all signals below the specified frequency to pass a signal to amplifier 28 where the signal is amplified to produce a transmitting signal Tx. The resultant transmitting signal from amplifier 28 is an amplitude modulated carrier frequency suitable for transmission over bi-directional telephone lines through an appropriate signal isolation transformer 30.

While the instant location unit is transmitting a signal above a certain frequency, a remote location unit is transmitting a signal below a specified lower frequency constituting the performance taking place at the remote location. The signal being transmitted by the remote location unit can have frequency components at, for example, 1 kHz or less.

A composite signal Rx is received over telephone lines by signal isolation transformer 30. The composite signal constitutes both the performance at the instant location with higher frequencies and performance at the remote location with frequencies below a specified lower level. The composite signal is sent to low pass filter 32 which filters out all signals above the lower specified frequency level, leaving only signals received from the remote location unit reflecting the performance at the remote location. This remaining signal is sent to amplifier 34 which amplifies the signal and includes volume control for adjusting its volume. Amplifier 34 drives speaker 36 to produce an audio replication of the performance taking place at the remote location.

Figure 2:
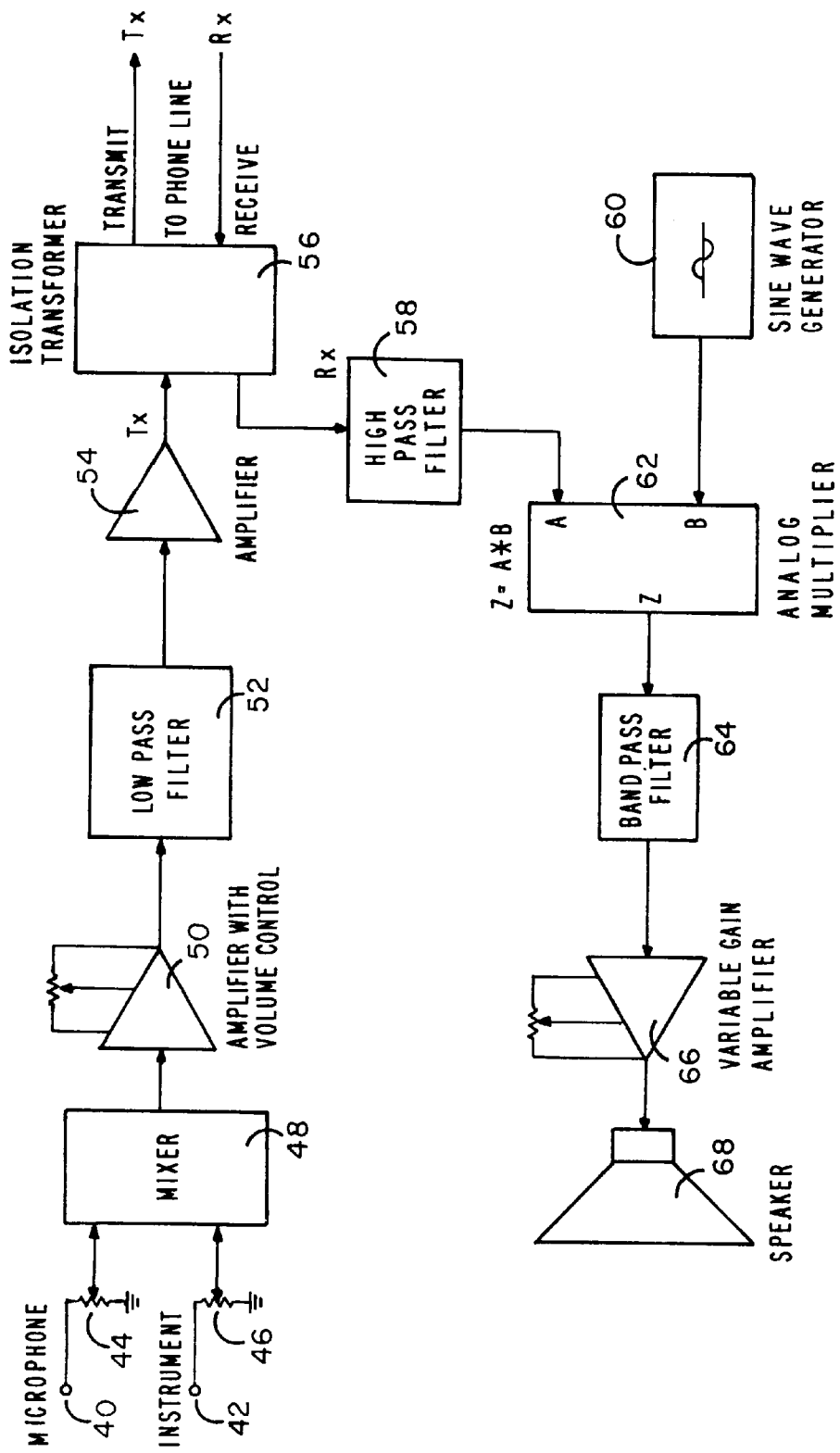
FIG. 2 illustrates a schematic diagram of the telephone interface unit of this invention at a remote location.

FIG. 2 illustrates a block diagram of the preferred embodiment of the telephone interface unit at a remote location. A microphone input 40 and instrument input 42 provide in combination with first and second volume controls 44 and 46, respectively, electrical analog signals of the audio signals produced by performers not shown. The audio signals from each performer are combined by mixer 48 and amplified by amplifier 50, which has a volume control to adjust the volume of the combined audio signal. The amplified signal is sent to low pass filter 52 which allows only signals at frequencies below the lower specified frequency level to pass to amplifier 54. Amplifier 54 amplifies the resultant signal to produce a transmitting signal Tx. The transmitting signal passes through signal isolation transformer 56 over bidirectional telephone lines.

The remote location unit receives a composite signal Rx from signal isolation transformer 56. The composite signal constitutes the performance at the remote location with lower frequencies combined with the performance from the instant location at higher frequencies. The composite signal is passed through high pass filter 58 to filter out the performance from the remote location to leave the transmitting signal from the instant location at frequencies above a specified frequency. The resulting signal contains the audio information from the instant location and the carrier frequency. This signal is sent to analog multiplier 62, where it is multiplied by the specified carrier frequency produced by sine wave generator 60. The signal from analog multiplier 62 is filtered by band pass filter 64 and amplified by variable gain amplifier 66, driving speaker 68 to produce an audio replication of the performance taking place at the instant location.

Although the invention has been described with reference to particular embodiments, it will be apparent to those skilled in the art that variations and modifications can be substituted therefor without departing from the principles and spirit of the invention.

I claim:

1. A telephone interface system to interconnect the audio signals of two or more performers, one or more at a first location and one or more at a second location over interconnected bi-directional communication lines, said system comprising:

input means at said first location to receive said audio signal from said first location and convert said signal to an electrical analog signal;

a sine wave generator means at said first location to produce a carrier frequency;

analog multiplier means at said first location to receive and combine said analog signal and said carrier frequency to produce a first amplitude modulated carrier signal;

a high pass filter means at said first location to filter said first amplitude modulated carrier signal and allow only frequencies above a specified higher frequency to pass;

a signal isolation transformer at said first location connected to said bi-directional communication lines to transmit to and receive signals from said second location, said signal isolation transformer also receiving said first amplitude modulated carrier signal and providing a combined transmitted and received signal to said first location;

a low pass filter means at said first location to filter the received signal to allow only frequencies below a lower specified frequency to pass;

input means at said second location to receive said audio signal from said second location and convert said signal to an electrical analog signal;

a low pass filter means at said second location to filter said second location audio signal to allow only frequencies below said second lower specified frequency to pass;

a signal isolation transformer at said second location connected to said bi-directional communication lines to transmit to and receive signals from said first location, said signal isolation transformer also receiving said signal from said second location and providing a combined transmitted and received signal to said second location;

a high pass filter means at said second location to filter said combined first and second location signals to allow only frequencies above said specified higher frequency to pass;

a second sine wave generator at said second location to produce a carrier frequency;

an analog multiplier means at said second location to receive and combine said analog signals, said carrier frequency to eliminate said carrier signal;

a band pass filter means at said second location to filter the resulting signal; and amplification means including a speaker at said second location to produce an amplified electrical analog signal.

* * * * *